March 21, 1950          A. JACOBS          2,501,176
LICENSE PLATE HOLDER
Filed Nov. 4, 1948          2 Sheets-Sheet 1
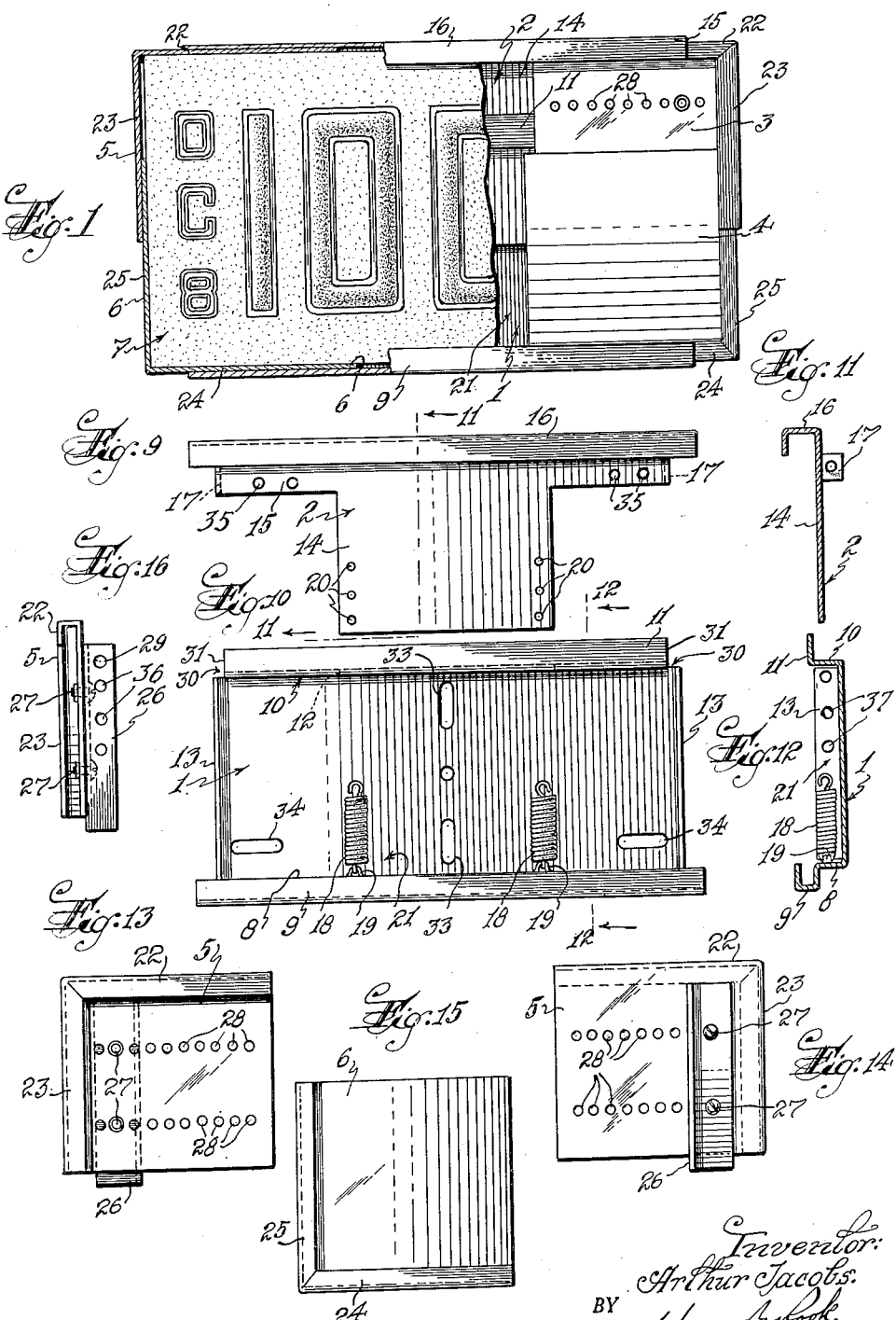
Inventor:
Arthur Jacobs

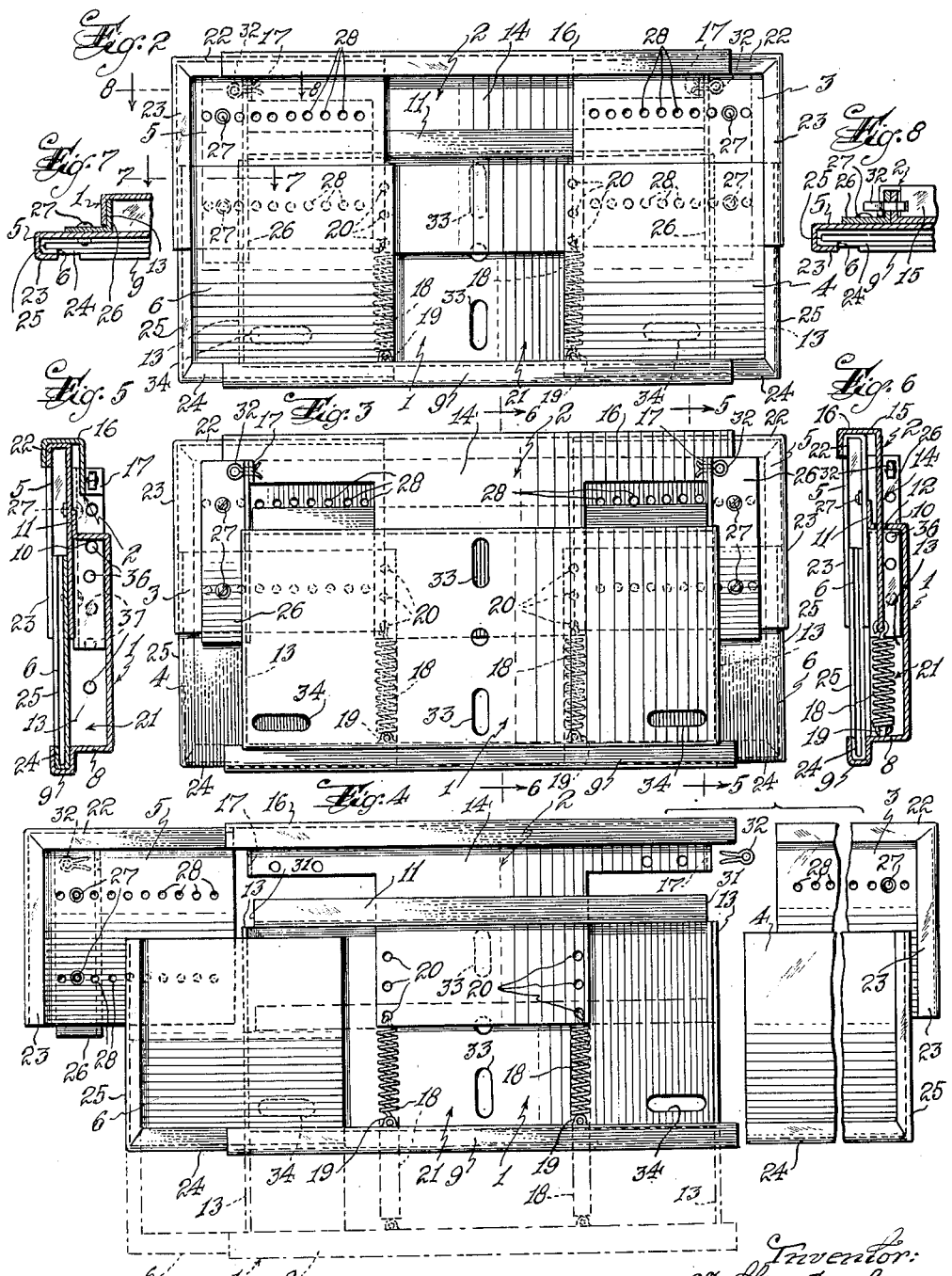

Patented Mar. 21, 1950

2,501,176

UNITED STATES PATENT OFFICE 2,501,176

LICENSE PLATE HOLDER

Arthur Jacobs, Newark, N. J.

Application November 4, 1948, Serial No. 58,263

4 Claims. (Cl. 40—125)

This invention relates to license plate holders for automobiles.

A prime object of the present invention is to provide a license plate holder that can readily be adjusted to support license plates of various sizes.

Another object is to provide a holder of this type in which the license plate may easily be inserted into and removed therefrom.

Another object is to provide a license plate holder that holds the plate firmly thereby preventing rattling or vibration of the plate.

Another object is to provide a license plate holder that holds the plate level and prevents displacement thereof.

Another object is to provide a license plate holder that protects the edges of the plate from becoming bent or otherwise damaged.

Another object is to provide a license plate holder that is simple in construction and economical to manufacture.

Other objects and advantages of the invention will be understood from the description thereof to follow taken in connection with the accompanying drawings in which—

Figure 1 is a front view of a license plate holder embodying my invention showing a license plate in position thereon, some of the parts being broken away.

Figure 2 is a front view of the license plate holder of Figure 1 with the license plate removed.

Figure 3 is a rear view of the device of Figure 2.

Figure 4 is a view similar to Figure 1 but showing in full lines some of the parts in disassembled relation and showing in dot-dash lines other parts in moved position.

Figure 5 is a sectional view taken on the plane of the line 5—5 of Figure 3.

Figure 6 is a sectional view taken on the plane of the line 6—6 of Figure 3.

Figure 7 is a sectional view taken on the plane of the line 7—7 of Figure 2.

Figure 8 is a sectional view taken on the plane of the line 8—8 of Figure 2.

Figure 9 is a detail front view of the upper movable plate member.

Figure 10 is a detail front view of the base plate member with springs mounted thereon.

Figure 11 is a sectional view taken on the plane of the line 11—11 of Figure 9.

Figure 12 is a sectional view taken on the plane of the line 12—12 of Figure 10.

Figure 13 is a front view of the upper left hand corner plate member.

Figure 14 is a rear view thereof.

Figure 15 is a front view of the lower left hand corner plate member.

Figure 16 is a view looking from the right hand end of Figure 13.

Referring to the drawings, the holding device is formed of sheet metal of suitable thickness and comprises a base plate member 1, a vertically movable upper plate member 2, right-hand upper and lower corner plate members 3 and 4, respectively, and left-hand upper and lower corner plate members 5 and 6, respectively.

The base plate 1 is substantially the shape of a standard automobile license plate 7 and at its bottom end has a forwardly projecting horizontally disposed flange portion 8 bent upon itself to form a vertically disposed U-shaped channel portion 9 with an open top for receiving the lower edge of the license plate. At its top end, the plate 1 is formed with another rearwardly projecting horizontally disposed flange portion 10, the free edge of the flange portion being bent upwardly as indicated at 11 to stiffen the flange portion and provide a bearing surface for the rear surface of the license plate. The flange portion 10 is formed with a central elongated slot 12. The side ends of the plate 1 are bent forwardly to form end flanges 13, 13.

The upper movable plate member 2 is T-shaped having a flat body portion 14 shorter in length than the base plate 1 with a top portion 15 substantially the length of the base plate. The upper end of the top portion 15 is bent upon itself to form a U-shaped vertically disposed channel portion 16 open at its bottom end to receive the upper edge of the license plate 7. The ends of the top portion 15 are bent rearwardly to form perforated lug members 17. The body portion 14 slides freely through the elongated slot 12 in the flange portion 10 of plate 1 thereby interlocking plates 1 and 2 together.

By means of tension springs 18 secured to the flange portion 8 of base plate 1 by instruck lugs 19 and removably connected to the movable plate 2 through spaced openings 20 along the side edges of the body portion 14 thereof, the base plate and movable plate are normally drawn toward each other. To afford protection for these springs, they are positioned in the recess 21 in the base plate formed by the forwardly extending flange portions thereof as shown in Figures 6 and 12. The license plate when mounted on the base plate and movable plate is in front of the springs with its rear surface in engagement with the bent up edge 11 of the flange portion 10 of the base plate.

Each of the upper corner plates 3 and 5 is substantially square and has its upper edge bent to form a U-shaped channel portion 22 opening inwardly, and has one of its adjacent side edges bent inwardly to form a U-shaped channel portion 23 opening inwardly, as seen in Figure 13. The channel portions 22 and 23 are smaller in diameter than the channel portion 16 of the upper movable plate member 2 so that the channel portion 22 may freely slide horizontally therein, but said channel portions 22 and 23 are sufficiently wide to receive and grip the upper corner and adjacent edges of the license plate.

Each of the lower corner plates 4 and 6 is similar in shape to the upper corner plates but has its bottom edge bent to form a U-shaped channel portion 24 opening upwardly and has one of its adjacent side edges bent to form a similar channel portion 25 as shown in Figure 15. The channeled portions of the lower corner plates are smaller in diameter than the channeled portions of the base plate 1 and of the upper corner plates so that they fit in said latter channeled portions and freely slide horizontally therein and vertically therein, respectively. They are sufficiently wide however to receive and grip the lower corners and adjacent edges of the license plate.

An elongated L-shaped bracket member 26 is so fastened to the rear surface of each of the upper corner plates 3 and 5 by means of suitable fastening members 27 extending through rows of spaced openings 28 in the plate members that one portion of said bracket extends perpendicularly of the plate and is formed with an opening 29 adjacent one end thereof as seen in Figure 16. The bracket may be adjusted horizontally of the plate by means of the openings 28.

In mounting the license plate 7 in the holder, the corner plates are first mounted on the corners thereof with the brackets 26 of the upper corner plates adjusted so that they will be in a line with the spaces indicated at 30 between the ends 31 of the top horizontal flange portion 10 and the top ends of vertical flanges 13, 13 of the base plate 1. The top edge of the license plate with the corner plates thusly positioned thereon is inserted into the channel portion 16 of the movable plate member 2 and said plate member 2 moved upwardly against the action of the springs 18 until the lower edge of the license plate can drop into the channel portion 9 of the lower flange 8 of the base plate 1 and the brackets 26 drop into interlocking relation with the flanges 10 and 13. When the license plate is thus positioned and pressure is released, the springs will draw the plate member 2 the lower flange portion 8 of the base plate 1. The movable plate member will carry the license plate and upper corner plates downwardly with it so that the corner lower and upper plates and license plate will be firmly held against vertical movement between said base plate and movable plate member. The interlocking relation between the brackets 26 and flanges 10 and 13 is such that engagement of the brackets with said flanges will firmly hold the license plate and corner plates against horizontal or longitudinal movement. When the corner plates are fitted in the channel portion 16 of the movable plate 2, the openings 29 in said brackets are in alignment with the perforations in the lugs 17 on the movable plate and movement of said corner plates in all directions may be prevented by insertion of a cotter pin or the like 32 through said aligned openings.

The holder assembly is secured to the automobile or other vehicle by means of fastening members such as bolts or the like (not shown) extending through vertically and horizontally disposed slots 33 and 34, respectively, formed in the base plate 1. There is plenty of room in the recess 21 for the heads of such fastening members.

The height of the plate members 1 and 2 and the arrangement of openings 20 in the plate member 2 are such that when the springs are in the uppermost pair of said openings 20 and are fully retracted, the channel portions 9 and 16 of the base plate 1 and movable plate 2, respectively, are closer than the height of any of the smaller license plates now in use, while when the springs are in the lowermost pair of openings 20 and are under maximum tension, there is room for any of the taller license plates having exceptionally tall numerals.

The sliding arrangement of the corner plates horizontally and their telescopic relationship with the base plate and movable plate member are such that license plates of various lengths may be firmly held and gripped along all of these edges thereby preventing rattling or accidental displacement of the license plates.

It will be understood that with the construction above described, the bolts that are used for mounting the holder on an automobile or other vehicle will be concealed at the front of the holder by the license plate which will overlie the heads of the bolts that extend through the slots 33 and 34.

Also, it will be seen that another important feature of my invention is the elimination of bolts, screws and similar fastening members for securing the license plate in the holder.

Furthermore it will be understood by those skilled in the art that the holder can be mounted in the reversed position from that shown on the drawings, that is, the U-shaped channel portion 9 and the plate member 2 might be located at the upper and lower edges of the holder, respectively, instead of at the lower and upper edges as shown in the drawings.

In order to permit the attachment of symbols and the like to my holder with the fastening elements concealed, I may provide a plurality of holes 35 in the plate 2 so that an emblem may be disposed at the rear of said plate and fastened thereto by bolts fastened through said openings, and the bolts at the front of the holder will be covered by the license plate. Also, if desired, the fastening bolts or members may be passed through any of the exposed holes 28 in the corner pieces 5.

Instead of or in addition to the pin 32 securing the flange 26 of the corner piece to the flange 17 of the base plate, the flange 26 may be provided with additional holes 36 so that when the plate is mounted in the holder, said holes may be aligned with additional holes 37 in the end flanges 13 of the base plate 1, and a pin 32 or other suitable fastening element may be slipped through any of said registering openings 36 and 37.

From the foregoing, it will be clear to those skilled in the art that my holder provides a secure support for a license plate on a vehicle which will prevent loss of the plate, reduce the possibility of rattling of the plate during motion of the vehicle and also ensure that the plates shall be maintained in proper horizontal position against tilting.

It will be understood that instead of two springs 18 a single spring positioned centrally of the base plate 1 and movable plate member 2 may be used. Other changes in details might be made without departing from the principle or scope of the invention.

What I claim is:

1. A license plate holder comprising a base plate having a channel portion at its lower end opening upwardly for receiving the lower edge of a license plate, a flange at its top end and flanges at its side ends, a movable plate member interlocked with the top flange of said base plate and having a channel portion opening downwardly for receiving the upper edge of the license plate, corner plates having channel portions for receiving the corners and adjacent edges of the license plate, said corner plates being slidable longitudinally and transversely of the license plate, spring means for drawing the base plate and movable plate toward each other and brackets on opposite corner plates coacting with the flanges at the top end and side ends of the base plate for preventing movement of the corner plates longitudinally of the license plate.

2. A license plate holder comprising a base plate having a channel portion at its lower end opening upwardly for receiving the lower edge of a license plate, a flange at its top end and flanges at its side ends, a movable plate interlocked with the top flange of said base plate and having a channel portion opening downwardly for receiving the upper edge of the license plate and having perforated lugs at its side edges adjacent its top end, corner plates having channeled portions for receiving the corners and adjacent edges of the license plate, said corner plates being slidable longitudinally and transversely of the license plate, spring means for drawing the base plate and movable plate toward each other and brackets on opposite corner plates coacting with the flanges at the top end and side ends of said base plate for preventing movement of the corner plates longitudinally of the license plate, said brackets having openings adapted to register with the perforations in the lugs of the movable plate for receiving fastening members whereby the plates are held against movement in all directions.

3. A license plate holder as defined in claim 1 in which the base plate has elongated openings for receiving fastening members to mount the assembly on a vehicle.

4. A license plate holder as defined in claim 3 wherein said base plate is recessed to receive the heads of said fastening members and said heads are overlaid and concealed by said license plate.

ARTHUR JACOBS.

REFERENCES CITED

The following references are of record in the file of this patent:

UNITED STATES PATENTS

| Number | Name | Date |
|---|---|---|
| 1,578,357 | Parkins | Mar. 30, 1926 |
| 1,898,024 | Von Hacht | Feb. 21, 1933 |
| 2,162,634 | Paine | June 13, 1939 |
| 2,213,909 | Herken | Sept. 3, 1940 |
| 2,350,993 | Aigner et al. | June 13, 1944 |